US012583513B2

(12) United States Patent
Heilig et al.

(10) Patent No.: US 12,583,513 B2
(45) Date of Patent: Mar. 24, 2026

(54) METHOD FOR MONITORING A STEERING SYSTEM

(71) Applicant: Robert Bosch GmbH, Stuttgart (DE)

(72) Inventors: Arnulf Heilig, Schwaebisch Gmuend (DE); Patrick Ebert, Langfurth (DE); Michael Friedel, Ruppertshofen (DE)

(73) Assignee: Robert Bosch GmbH, Stuttgart (DE)

( * ) Notice: Subject to any disclaimer, the term of this patent is extended or adjusted under 35 U.S.C. 154(b) by 126 days.

(21) Appl. No.: 18/578,800

(22) PCT Filed: Jun. 14, 2022

(86) PCT No.: PCT/EP2022/066141
§ 371 (c)(1),
(2) Date: Jan. 12, 2024

(87) PCT Pub. No.: WO2023/011788
PCT Pub. Date: Feb. 9, 2023

(65) Prior Publication Data
US 2024/0300572 A1 Sep. 12, 2024

(30) Foreign Application Priority Data

Aug. 5, 2021 (DE) ..................... 10 2021 208 486.9

(51) Int. Cl.
*B62D 5/04* (2006.01)
*F16H 57/01* (2012.01)

(52) U.S. Cl.
CPC ........... B62D 5/0481 (2013.01); F16H 57/01 (2013.01); *B62D 5/0424* (2013.01); *F16H 2057/018* (2013.01)

(58) Field of Classification Search
None
See application file for complete search history.

(56) References Cited

U.S. PATENT DOCUMENTS

| | | | |
|---|---|---|---|
| 8,380,387 B2 * | 2/2013 | Kluge .................. | B62D 5/0481 |
| | | | 701/30.8 |
| 10,106,190 B2 * | 10/2018 | Bremkens ............ | B62D 5/0481 |
| 11,492,038 B2 * | 11/2022 | Acosta Aponte .... | B62D 5/0481 |
| 12,084,121 B2 * | 9/2024 | Albrecht ................ | B62D 6/008 |

(Continued)

FOREIGN PATENT DOCUMENTS

| | | | | |
|---|---|---|---|---|
| BE | 1030957 A1 * | 5/2024 | .......... | B62D 5/0424 |
| BE | 1030957 B1 * | 5/2024 | .......... | B62D 5/0424 |

(Continued)

OTHER PUBLICATIONS

International Search Report corresponding to PCT Application No. PCT/EP2022/066141, mailed Oct. 4, 2022 (German and English language document) (5 pages).

*Primary Examiner* — Kevin R Steckbauer
(74) *Attorney, Agent, or Firm* — Maginot, Moore & Beck LLP

(57) ABSTRACT

A method is for monitoring a steering system during operation in a vehicle. The steering system includes at least one steering actuator. In order to determine a force-closure detachment and/or torque detachment in the steering system, at least one operating signal of the at least one steering actuator is determined and evaluated, and a jerk signal is determined from the at least one operating signal and is monitored for changes.

14 Claims, 3 Drawing Sheets

(56)                  References Cited

U.S. PATENT DOCUMENTS

| | | | | |
|---|---|---|---|---|
| 2010/0274437 A1 * | 10/2010 | Kluge | .................. | B62D 5/0481 |
| | | | | 701/31.4 |
| 2016/0001814 A1 * | 1/2016 | Endo | ........................ | B62D 6/08 |
| | | | | 701/41 |
| 2018/0237056 A1 * | 8/2018 | Bremkens | ............. | G01L 5/0042 |
| 2021/0323602 A1 * | 10/2021 | Acosta Aponte | .... | B62D 5/0481 |
| 2023/0017618 A1 * | 1/2023 | Albrecht | ................ | B62D 6/008 |
| 2024/0300572 A1 * | 9/2024 | Heilig | .................. | B62D 5/0481 |

FOREIGN PATENT DOCUMENTS

| | | | | | |
|---|---|---|---|---|---|
| CN | 117836191 A | * | 4/2024 | ............. | F16H 57/01 |
| CN | 119117084 A | * | 12/2024 | ........... | B62D 5/0481 |
| CN | 119190193 A | * | 12/2024 | ........... | B62D 5/0481 |
| CN | 119190193 B | * | 5/2025 | ........... | B62D 5/0481 |
| DE | 102008021849 A1 | * | 11/2009 | ........... | B62D 5/0481 |
| DE | 10 2013 220 519 B4 | | 12/2017 | | |
| DE | 10 2018 113 329 A1 | | 12/2018 | | |
| DE | 102008021849 B4 | * | 8/2022 | ........ | B62D 15/0235 |
| DE | 102021208486 A1 | * | 2/2023 | ............. | F16H 57/01 |
| EP | 4353568 A1 | * | 4/2024 | ........... | B62D 5/0424 |
| EP | 4353568 B1 | * | 11/2024 | ............. | F16H 57/01 |
| EP | 4380844 B1 | * | 6/2025 | ............. | F16H 57/01 |
| JP | 2024528239 A | * | 7/2024 | ............. | F16H 57/01 |
| KR | 20090058168 A | * | 6/2009 | ........... | B62D 5/0409 |
| WO | WO-2023011788 A1 | * | 2/2023 | ............. | F16H 57/01 |

* cited by examiner

METHOD FOR MONITORING A STEERING SYSTEM

This application is a 35 U.S.C. § 371 National Stage Application of PCT/EP2022/066141, filed on Jun. 14, 2022, which claims the benefit of priority to Serial No. DE 10 2021 208 486.9, filed on Aug. 5, 2021 in Germany, the disclosures of which are incorporated herein by reference in their entirety.

BACKGROUND

The disclosure relates to a method for monitoring a steering system. The disclosure also relates to a control unit comprising a computing unit for carrying out such a method, a steering system comprising a computing unit for carrying out such a method, and to a vehicle comprising such a steering system.

From the prior art, such as DE 10 2008 021 849 A1, a method for monitoring a steering system is known, wherein a belt jump detection device is used to detect a belt jump and consequently a force-closure detachment and/or torque detachment in the steering system, which detects a belt jump by evaluating a manual torque applied to the steering wheel, a manual angle applied to the steering wheel, and a steering angle of the vehicle wheels or an operational signal of a steering actuator. However, detecting a belt jump based on a detected manual torque, for example, causes problems with autonomously driven vehicles or with steer-by-wire steering systems. In this case, the detection is also influenced by system stiffness and may be falsified.

The object of the disclosure is in particular to provide a method for monitoring a steering system with improved properties in terms of efficiency. The problem is solved according to the approach disclosed herein.

SUMMARY

The disclosure relates to a method for monitoring a steering system, more particularly during the operation in a vehicle, wherein the steering system comprises at least one steering actuator, and wherein, in order to determine a force-closure detachment and/or torque detachment in the steering system, at least one operating signal of the steering actuator is determined and evaluated.

It is proposed that, in order to determine a force-closure detachment and/or torque detachment in the steering system, a jerk signal is determined from the operating signal and is monitored for changes. Advantageously, a time curve of the jerk signal, in particular over a total monitoring time interval, is determined and evaluated. The evaluation is advantageously carried out in the time range. In principle, however, the jerk signal could also be evaluated in the frequency range. This configuration in particular makes it possible to improve efficiency, in particular a detection efficiency, computational efficiency, and/or cost efficiency. In addition, advantageously robust detection and/or evaluation of a force-closure detachment and/or torque detachment in the steering system can be achieved and operational reliability can be increased. In addition, a particularly high degree of flexibility and/or variability can be achieved.

Preferably, the vehicle is configured as a motor vehicle and comprises, in particular, the steering system and a detection sensor system, which is provided for sensing at least one operating signal of the steering actuator. Moreover, the steering system can be designed as a conventional steering system, in particular as an electric power steering system, and can comprise a mechanical hand grip. Alternatively, however, the steering system can be designed as a steer-by-wire steering system, in which a steering command is transmitted to the vehicle wheels purely electrically. Furthermore, a "steering actuator" should in particular be understood to mean an at least partially electrically and/or electronically designed actuator unit which is designed to provide a steering torque and thereby advantageously influence a direction of travel of the vehicle. The steering actuator is preferably designed to provide a steering torque to support a manual torque applied to a steering handle and/or a steering torque for automatic and/or autonomous control of a direction of travel of the vehicle. To this end, the steering actuator may comprise at least one electric motor.

The vehicle also comprises a computing unit which is provided to perform the method for monitoring the steering system. The term "computing unit" is in particular intended to mean an electrical and/or electronic unit which comprises an information input, an information processor, and an information output. Advantageously, the computing unit further comprises at least one processor, at least one operating memory, at least one input and/or output means, at least one operating program, at least one control routine, at least one calculation routine, at least one identification routine, at least one evaluation routine, and/or at least one monitoring routine. In particular, the computing unit is provided to determine the operating signal, in particular to retrieve and/or receive it from the detection sensor system, and to evaluate it. In addition, the computing unit is provided to determine a jerk signal from the operating signal and monitor for changes in order to determine the force-closure detachment and/or torque detachment in the steering system. The computing unit is in this case preferably integrated into a control device of the vehicle, e.g., a central vehicle control device, or a control device of the steering system, in particular in the form of a steering control device. In this context, a "force-closure detachment and/or torque detachment" is to be understood in particular as a sudden and/or abrupt relative movement and/or an at least short-term interruption and/or a release of a force-closure between two components of the steering system which are connected to one another in a force-fit or form-fit manner. The force-closure detachment and/or torque detachment in particular leads to a loss of steering support at least in the short term. In addition, the force-closure detachment and/or torque detachment can generally also lead to an offset in the steering system, in particular in a sensor and/or servo train of the steering system, and accordingly cause an offset between a measured steering angle and an actual steering angle, for example. In addition, a "jerk signal" should in particular be understood to mean a signal that is correlated to a jerk occurring in the steering system, i.e., a time change of an acceleration. The term "provided" is in particular intended to mean specifically programmed, designed, and/or equipped. The phrase "an object being provided for a specific function" is particularly intended to mean that the object fulfills and/or performs this specific function in at least one application and/or operating state.

Furthermore, it is proposed that the force-closure detachment and/or torque detachment in the steering system is determined based on at least one signal peak, in particular based on one peak, in the jerk signal, whereby in particular a particularly simple detection of a short-term force-closure detachment and/or torque detachment in the steering system, for example a slippage and/or a jump, can be achieved.

Alternatively or additionally, it is suggested that the force-closure detachment and torque detachment in the steering system is determined if the jerk signal exceeds a, in particular defined and/or definable, threshold value. Additionally, in this case, a timespan during which the jerk signal exceeds the threshold may also be monitored and/or determined, whereby it is advantageously possible to conclude a type of force-closure detachment and/or torque detachment. If the jerk signal only exceeds the threshold value for a short time, for example for a few milliseconds, then a temporary force-closure detachment and/or torque detachment in the steering system, for example a slippage and/or a jump, can in particular be concluded. If, on the other hand, the jerk signal exceeds the threshold value for a longer time or permanently, damage to the steering system, for example a deformation or a break, can in particular be concluded.

Furthermore, it is suggested that a position signal, a speed signal, or an acceleration signal of the steering actuator be used as the operating signal, whereby the jerk signal can advantageously be easily determined. The position signal may advantageously be a rotor position signal of the steering actuator, in particular the electric motor of the steering actuator. The speed signal may advantageously be a rotor speed signal of the steering actuator, in particular the electric motor of the steering actuator. In addition, the acceleration signal may advantageously be a rotor acceleration signal of the steering actuator, in particular the electric motor of the steering actuator.

Preferably, the jerk signal is determined based on a time rate of change of the operating signal and/or by means of a time derivation of the operating signal. Advantageously, a position signal of the steering actuator can be used as the operating signal and the jerk signal can be determined, for example, based on a third time derivation of the position signal. Alternatively, however, a speed signal from the steering actuator could also be used as the operating signal and the jerk signal could be determined, for example, based on a second time derivation of the speed signal. In addition, an acceleration signal from the steering actuator could also be used as the operating signal, and the jerk signal could be determined, for example, from a first time derivative of the acceleration signal. In particular, an advantageously low-cost solution can be provided by using any existing or retrievable signals.

Furthermore, the force-closure detachment and/or torque detachment in the steering system corresponds to a force-closure detachment and/or torque detachment in the sensor train and/or a force-closure detachment and/or torque detachment in the servo train, whereby in particular a variable and/or extensive monitoring of the steering system can be achieved. For example, the sensor train may correspond to a steering shaft and/or steering column of the steering system, while the servo train may in particular correspond to a steering gear of the steering system.

The force-closure detachment and torque detachment could also be caused by slippage, sliding, and/or a jump of any mechanical interface in the steering system. According to one embodiment, however, it is proposed that the steering system comprises at least one, in particular a force-fit and/or form-fit acting, traction means and/or at least one, in particular a force-fit or form-fit acting, tolerance ring and that the force-closure detachment and/or torque detachment is caused by a slippage, sliding, and/or a jump of the traction means and/or the tolerance ring. The traction means can in particular be part of a coupling gear, for example for connecting the steering actuator to the steering gear, and in particular as a belt, preferably as a tooth belt. The tolerance ring may, for example, be part of a slip clutch and/or a screw gear. In particular, this may increase an efficiency of the method, and the main causes of a force-closure detachment and/or torque detachment in the steering system may be monitored.

It is further proposed that an event counter be used to determine the force-closure detachment and/or torque detachment in the steering system. In this case, in particular, by evaluating the jerk signal, and in particular based on a signal peak and/or abnormality in the jerk signal, a counter value of the event counter is initially incremented and, in the event that the counter value of the event counter exceeds a limit value, for example three or four, a force-closure detachment and/or torque detachment in the steering system is concluded. As a result, a system response, preferably in the form of a safety measure, may then be initiated and/or performed. For example, the system response may comprise generating an information message and/or a degradation of the steering system or vehicle. Particularly preferably, the counter value of the event counter is also reset, in particular, zeroed, if no signal peak and/or abnormality in the jerk signal occurs within a defined and/or definable time. This can in particular increase robustness and/or operational reliability.

It is preferably further proposed that at least one plausibility variable be considered when determining the force-closure detachment and torque detachment in the steering system, and in particular for increased robustness and/or plausibility. Preferably, the plausibility variable is a sensor-driven operating and/or detection signal, such as a manual torque and/or a steering handle deflection, a servo train-side operating and/or detection signal, such as a torque, an angle of rotation, a speed, preferably a mean value of a rotor speed, and/or an acceleration of the steering actuator, and/or an operating and/or sensing signal correlated to a driving state of the vehicle, such as a vehicle speed and/or a yaw moment. Particularly advantageous, a plurality of plausibility variables, for example at least two or at least three plausibility variables, can also be considered and/or linked to one another in determining the force-closure detachment and/or torque detachment in the steering system. A further increase of robustness can in particular be achieved here.

A particularly efficient method may further be achieved, in particular, when the steering system comprises at least one traction means in the form of a tooth belt having a plurality of teeth, and the force-closure detachment and torque detachment in the steering system is determined, wherein the number of signal peaks in the jerk signal is used to conclude a number of jumped teeth and/or a number of jumped teeth is determined.

The method for monitoring the steering system is not intended to be limited to the application and embodiment described hereinabove. In particular, the method for monitoring the steering system in order to achieve the functioning described herein can comprise a number of individual elements, components, and units that differs from the number specified herein.

BRIEF DESCRIPTION OF THE DRAWINGS

Further advantages will become apparent from the description of the drawings hereinafter. The drawings illustrate an exemplary embodiment of the disclosure.

The drawings show.

DETAILED DESCRIPTION

Figures 1A, 1B:
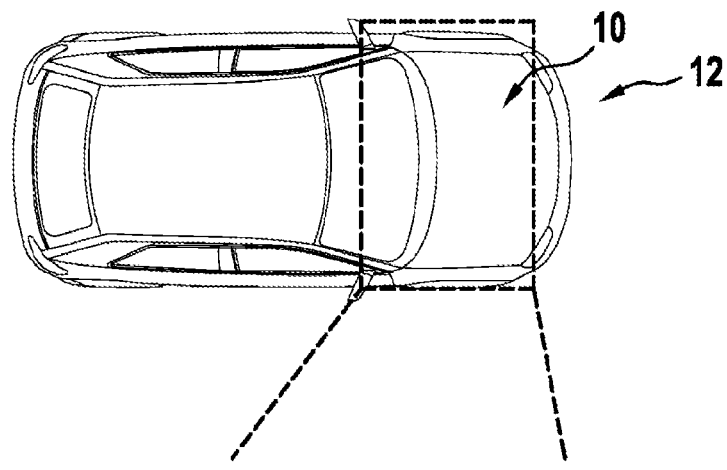
FIG. 1*a-b* an example of a vehicle comprising a steering system in a simplified illustration, FIG. 2 a diagram of various signals for monitoring the steering system, and FIG. 3 an exemplary flowchart showing the main method steps of a method for monitoring the steering system.

FIGS. 1*a* and 1*b* show a simplified illustration of a vehicle 12, which, as an example, is configured as a passenger vehicle comprising a plurality of vehicle wheels 40 and comprising a steering system 10. The steering system 10 is operatively connected to the vehicle wheels 40, which in the present case are in particular configured as front wheels, and is provided for influencing a direction of travel of the vehicle 12. The steering system 10 is moreover configured as an electrically assisted steering system and accordingly comprises electric power assistance in the form of a servo steering system. In principle, however, it is also conceivable to configure a steering system as a hydraulically assisted steering system, in particular comprising hydraulic power assistance. A steering system could furthermore in principle also be configured as a steer-by-wire steering system.

The steering system 10 comprises a steering handle 42, configured for example in the present case as a steering wheel, for applying a manual torque, a steering gearbox 44, which is configured for example as a rack-and-pinion steering gear, comprises a steering actuating element 46 and is provided for converting a steering input at the steering handle 42 into a steering movement of the vehicle wheels 40, and a steering shaft 48 for, in particular mechanically, connecting the steering handle 42 to the steering gear 44. The steering shaft 48 defines a sensor train 28 of the steering system 10. The steering gear 44 defines a servo train 30 of the steering system 10. A steering handle could alternatively also be configured as a steering lever or a steering ball or the like. It is also conceivable to forgo a steering handle. A steering shaft could moreover also connect a steering handle to a steering gear only intermittently and/or have a mechanical separation, such as in a steer-by-wire steering system.

The steering system 10 also comprises a steering actuator 14. The steering actuator 14 is at least partially configured electrically and/or electronically. The steering actuator 14 is operatively connected to the steering gear 44. The steering actuator 14 is designed to provide a steering torque to support an applied manual torque to the steering handle 42 and to transmit it to the steering actuating element 46. For this purpose, the steering actuator 14 comprises an electric motor (not explicitly shown). The electric motor in the present case is in particular configured as a permanently excited synchronous motor and is provided for producing the steering torque. In principle, however, a steering actuator could also comprise a plurality of electric motors.

To connect the steering actuator 14 to the steering gear 44, the steering system 10 further comprises a coupling gear box 50. In the present case, the coupling gear box 50 is configured as a traction means drive and comprises at least one traction means 32. The coupling gear box 50 is configured as a belt drive and consequently comprises a pulling means 32 configured as a belt, in the present case in particular as a tooth belt. The coupling gear box 50 is provided to transmit the steering torque of the steering actuator 14 to the steering gear 44 by means of the traction means 32. Alternatively, however, a coupling gear configured as a traction means drive could also be configured as a chain drive or the like and/or comprise a traction means configured as a flat belt, as a round belt, as a V-belt, and/or as a V-ribbed belt. Furthermore, it is conceivable to configure a coupling gear box as a screw gear box and/or a worm gear box. In addition, a coupling gear box and/or steering system could also comprise a tolerance ring.

In addition, the steering system 10 comprises one steering sensor system 52 which is arranged on the steering shaft 48 and is known per se. In the present case, the steering sensor system 52 is configured as a torque sensor. The steering sensor system 52 is provided to detect a sensor signal 54 correlated with an actuation of the steering handle 42, in particular a manual torque and/or torque applied to the steering handle 42. In the present case, the sensor signal 54 corresponds to a rotational rod signal. A steering sensor system could alternatively also be configured as a sensor other than a torque sensor, for example as a rotation angle sensor and/or as a combined torque and rotation angle sensor.

Furthermore, the steering system 10 comprises a detection sensor system 56 associated with the steering actuator 14. The detection sensor system 56 is configured as a rotor position sensor and is provided to acquire at least one operating signal 16 of the steering actuator 14, in the present case in particular a rotor position signal of the electric motor. However, alternatively or additionally, a detection sensor system could also be configured as a sensor deviating from a rotor position sensor, for example as a speed sensor and/or as an accelerometer.

The vehicle 12 also comprises a control unit 36. As an example, the control unit 36 is configured as a steering control unit and is therefore part of steering system 10. The control unit 36 has an electrical connection to the steering actuator 14. The control unit 36 also comprises an electrical connection to the steering sensor 52 and the detection sensor system 56. The control unit 36 is provided to receive the sensor signal 54 from steering sensor system 52 and the operating signal 16 from the detection sensor system 56. The control unit 36 is also provided for controlling the steering actuator 14.

The control unit 36 comprises a computing unit 38 for this purpose. The computing unit 38 comprises at least one processor, for example in the form of a microprocessor, and at least one operating memory. The computing unit 38 also comprises at least one operating program which is stored in the operating memory and includes at least one control routine, at least one calculation routine, at least one detection routine, at least one evaluation routine, and at least one monitoring routine. In principle, however, it is also conceivable to configure a control unit separately from a steering system. In this case, a vehicle could, for instance, have a single central control unit with a central computing unit.

In order to maintain correct operation of the steering system 10, a permanent force-closure in the steering system 10 is generally required. However, certain travel and/or operating situations may result in a force-closure detachment and/or torque detachment in the steering system 10. However, such a force-closure detachment and torque detachment may lead to safety-critical travel situations without sufficiently accurate detection.

For this reason, a method for monitoring the steering system 10 during operation in the vehicle 12 will now be described. In particular, the computing unit 38 is provided in order to carry out the method and has a computer program with corresponding program code means for this purpose.

According to the disclosure, at least one operating signal of the steering actuator 14, in the present case in particular the operating signal 16 detected by the detection sensor system 56, is determined and evaluated to determine a force-closure detachment and/or torque detachment in the steering system 10. For this purpose, a jerk signal 18 is generated from the operating signal 16 and monitored for changes. The force-closure detachment and torque detachment in the steering system 10 can be determined by means of at least one signal peak 20, 22, 24 in the jerk signal 18 or by means of exceeding a threshold value 26 (cf. in particular FIG. 2). In the present case, it is exploited that a very large rotor acceleration is generated in the steering system 10 in the event of a force-closure detachment and/or torque detachment, which can be determined by corresponding evaluation of the jerk signal 18. In principle, however, the jerk signal could also be evaluated in the frequency range. It is also conceivable to monitor and evaluate a gradient of the jerk signal.

The force-closure detachment and/or torque detachment further corresponds by way of example to a force-closure detachment and/or torque detachment in the servo train 30 and can be caused by a slippage, sliding, and/or a jump of the traction means 32. In principle, however, a force-closure detachment and torque detachment can also be effected by any other mechanical interfaces in the steering system 10, for example a tolerance ring, and occur in the sensor train 28, or in the sensor train 28 and in the servo train 30.

Furthermore, a position signal, in particular a rotor position signal, of the steering actuator 14 is used as an example as the operating signal 16, wherein the jerk signal 18 can be determined by means of a time derivation of the operating signal 16, in the present case in particular by means of a third time derivation of the operating signal 16. Alternatively, however, a speed signal or an acceleration signal of a steering actuator could be used as the operating signal.

Moreover, an event counter may be used to determine the force-closure detachment and/or torque detachment in the steering system 10. For example, the event counter may be integrated into the computing unit 38. In this case, by evaluating the jerk signal 18, and in particular based on a signal peak 20, 22, 24 and/or abnormality in the jerk signal 18, a counter value of the event counter is initially incremented and, in the event that the counter value of the event counter exceeds a threshold value, for example three or four, a force-closure detachment and/or torque detachment in the steering system 10 is concluded. As a result, a system response may then be initiated and/or performed. For example, the system response may comprise generating an information message and/or a degradation of the steering system 10 or vehicle 12. However, such an event counter could in principle also be omitted. In this case, a corresponding system response could already occur at a single signal peak and/or based on a time span during which the jerk signal 18 exceeds the threshold value 26.

Figure 2:
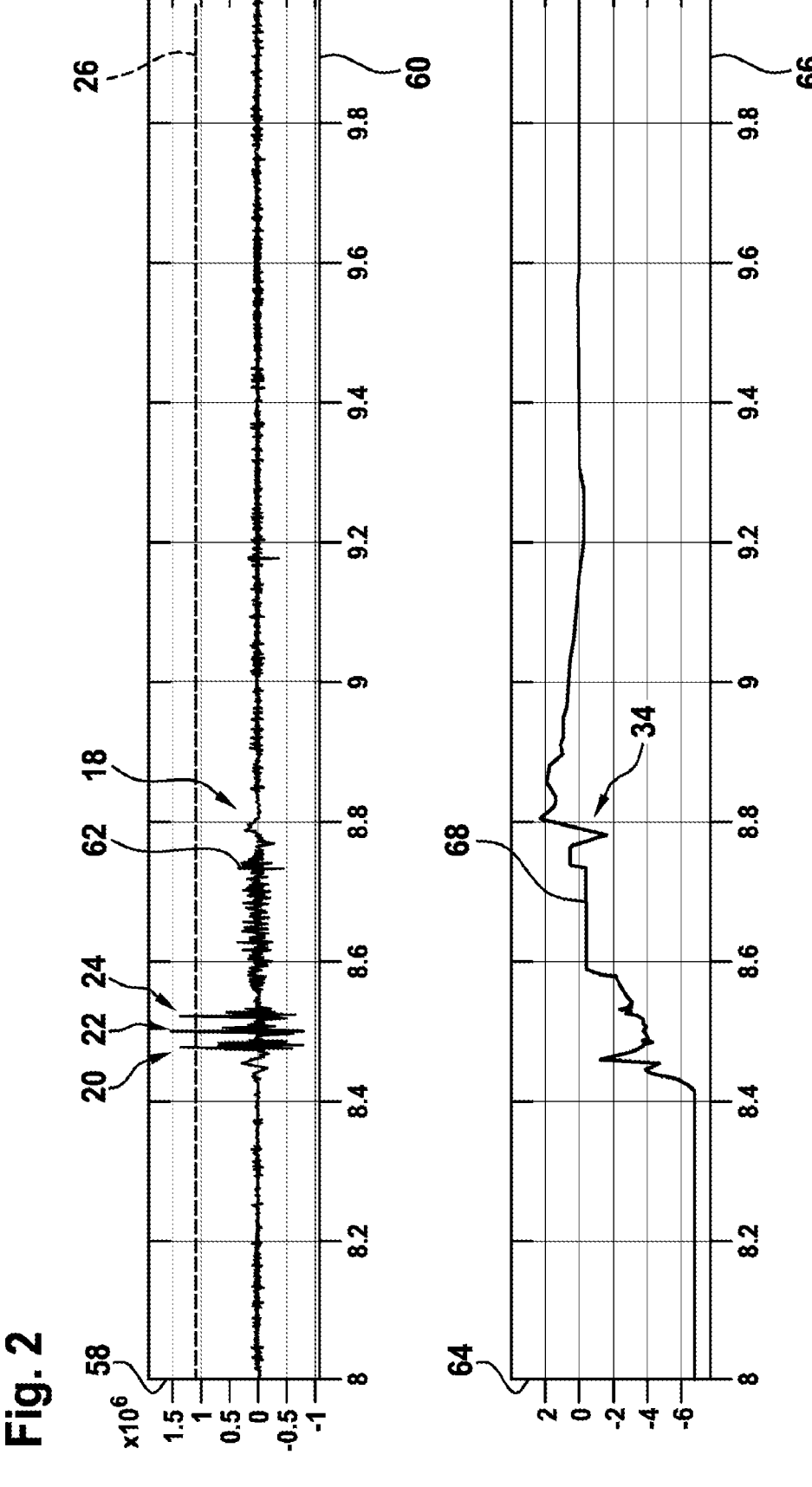

In order to further increase a robustness of the method, at least one plausibility variable 34 can also be taken into account when determining the force-closure detachment and/or torque detachment in the steering system 10 (cf. in particular FIG. 2). In the present case, the plausibility variable 34 is a servo-side operating and/or detection signal, in particular a torque of the steering actuator 14. Alternatively or additionally, however, an operating and/or detection signal on the sensor train side, such as sensor signal 54 and/or an operating and/or detection signal correlated with a driving state of the vehicle 12, such as a vehicle speed and/or a yaw moment, could also be used as a plausibility variable. In addition, it is conceivable to use an operating and/or detection signal on the servo train side that deviates from a torque of the steering actuator 14, such as a rotation angle and/or a rotational speed, preferably an average value of a rotor speed, of the steering actuator 14, as a plausibility variable. In addition, it is generally also conceivable to completely dispense with a plausibility check.

FIG. 2 shows an exemplary diagram of various signals for monitoring the steering system 10.

A first ordinate axis 58 is configured as a size axis and shows a jerk in [1/s³]. A time is shown in [s] on a first abscissa axis 60. A first curve 62 shows a time curve of the jerk signal 18. A second ordinate axis 64 is configured as a further size axis and shows a torque in [Nm]. A time is also shown in [s] on a second abscissa axis 66. A second curve 68 shows a time curve of the plausibility variable 34 or in the present case of the torque of the steering actuator 14.

Curve 62 indicates that after approximately 8.5 s, multiple signal peaks 20, 22, 24 appear in the jerk signal 18 which are characteristic of a force-closure detachment and/or torque detachment in the steering system 10. When using a traction means 32 in the form of a tooth belt with a plurality of teeth, the number of signal peaks 20, 22, 24 in the jerk signal 18 may also be used to conclude a number of jumped teeth. In the present case, this means that three teeth of the traction means 32 have been jumped.

Curve 68 may further be utilized to increase robustness and/or for the plausibility check of the force-closure detachment and/or torque detachment in the steering system 10. It can be seen from the curve of the plausibility variable 32 that shortly before the first signal peak 20 in the jerk signal 18, a drop in the torque of the steering actuator 14 occurs. This drop in torque of the steering actuator 14 in connection with the temporally subsequent signal peaks 20, 22, 24 in the jerk signal 18, are used as an indication of a force-closure detachment and torque detachment in the steering system 10.

Figure 3:
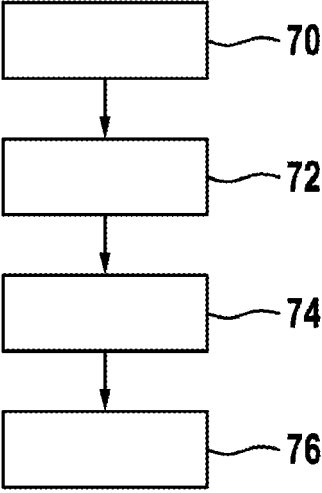

Finally, FIG. 3 shows an exemplary flowchart with the main method steps of the method for monitoring the steering system 10.

In a method step 70, the operating signal 16 of the steering actuator 14 is determined.

In a method step 72, the jerk signal 18 is determined from the operating signal 16. In the present case, this is done by a time derivation of the operating signal 16, in the present case in particular by a third time derivation of the operating signal 16.

In a method step 74, the jerk signal 18 is monitored and evaluated. In the present case, it is in particular monitored whether a signal peak 20, 22, 24 is present in the jerk signal 18 and/or whether the jerk signal 18 exceeds the threshold value 26. If this is the case, a force-closure detachment and/or torque detachment in the steering system 10 is concluded and a method step 76 follows.

In method step 76, a system response is initiated and/or performed. For example, the system response may comprise generating an information message and/or a degradation of the steering system 10 or vehicle 12.

The exemplary flowchart in FIG. 3 is only intended to describe a method for monitoring the steering system 10 by way of example. In particular, individual method steps can also vary, or additional method steps can be added. For example, an event counter may be used to determine the force-closure detachment and/or torque detachment in the steering system 10. Furthermore, when determining the force-closure detachment and torque detachment in the steering system 10, the plausibility variable 34 may be considered.

The invention claimed is:

1. A method for monitoring a steering system during operation in a vehicle, the steering system comprises at least one steering actuator, the method comprising:

operating the at least one steering actuator to cause rotation of a rotor of the at least one steering actuator;

determining at least one operating signal of the at least one steering actuator during the rotation of the rotor, the at least one operating signal based on the rotation of the rotor;

evaluating the determined at least one operating signal to determine a force-closure detachment and/or torque detachment in the steering system;

determining a jerk signal from the at least one operating signal; and monitoring the determined jerk signal for changes to determine the force-closure detachment and torque detachment in the steering system.

2. The method according to claim 1, further comprising:

determining the force-closure detachment and torque detachment in the steering system based on at least one signal peak in the jerk signal, and/or determining the force-closure detachment and torque detachment in the steering system when the jerk signal exceeds a threshold value.

3. The method according to claim 1, wherein a position signal, a speed signal, or an acceleration signal of the at least one steering actuator is used as the at least one operating signal.

4. The method according to claim 1, further comprising:

determining the jerk signal based on a time rate of change of the at least one operating signal and/or based on a time derivation of the at least one operating signal.

5. The method according to claim 1, wherein the force-closure detachment and torque detachment in the steering system corresponds to a force-closure detachment and torque detachment in a sensor train and/or a force-closure detachment and torque detachment in a servo train.

6. The method according to claim 1, wherein:

the steering system comprises at least one traction device and/or at least one tolerance ring, and the force-closure detachment and torque detachment is caused by a slippage, sliding, and/or a jump of the at least one traction device and/or the at least one tolerance ring.

7. The method according to claim 1, further comprising:

using an event counter to determine the force-closure detachment and torque detachment in the steering system; and initiating a system response when a counter value of the event counter exceeds a limit value.

8. The method according to claim 1, wherein:

when determining the force-closure detachment and/or torque detachment in the steering system at least one plausibility variable is considered, and the at least one plausibility variable is a sensor train-side operating and/or detection signal, a servo train-side operating and/or detection signal, and/or an operating and/or detection signal correlated with a driving state of the vehicle.

9. The method according to claim 1, wherein:

the steering system comprises at least one traction device including a tooth belt with a plurality of teeth, the force-closure detachment and/or torque detachment in the steering system is determined based on a signal peak in the jerk signal, and a number of signal peaks in the jerk signal is used to determine a number of jumped teeth of the plurality of teeth.

10. A control unit comprising:

a processor configured to carry out the method according to claim 1.

11. A steering system comprising:

at least one steering actuator; and a processor configured to perform the method according to claim 1.

12. The steering system according to claim 11, wherein a motor vehicle includes the steering system.

13. The method according to claim 1, further comprising:

initiating a system response of the vehicle when the force-closure detachment and/or the torque detachment has been determined to have occurred.

14. The method according to claim 13, wherein:

the system response includes a degradation of the steering system and/or the vehicle.

* * * * *